United States Patent [19]

Muller

[11] 3,723,657

[45] Mar. 27, 1973

[54] PROCESS FOR THE TRANSMISSION OF BINARY CODED SIGNALS USING TIME MULTIPLEX TECHNIQUES

[75] Inventor: Henrik Muller, Munich, Germany

[73] Assignee: Siemens Aktiengesellschaft, Berlin, Germany

[22] Filed: Feb. 9, 1971

[21] Appl. No.: 113,970

[30] Foreign Application Priority Data

Feb. 9, 1970 Germany.....................P 20 05 836.0

[52] U.S. Cl.............................179/15 BW, 179/15 A

[51] Int. Cl................................................H04j 3/04

[58] Field of Search..........179/15 BA, 15 BV, 18 FF; 178/50; 340/413

[56] References Cited

UNITED STATES PATENTS

| | | | |
|---|---|---|---|
| 3,532,827 | 10/1970 | Ewin | 179/18 FF |
| 3,238,298 | 3/1966 | Willis | 179/15 BA |
| 3,422,226 | 1/1969 | Acs | 179/15 BA |
| 3,300,763 | 1/1967 | Hoehman | 179/15 BA |

*Primary Examiner*—Ralph D. Blakeslee
*Assistant Examiner*—David L. Stewart
*Attorney*—Birch, Swindler, McKie & Beckett

[57] ABSTRACT

A process is described for the transmission of binary coded data according to time multiplex principles. The code element of least duration is scanned a number of times within each transmitting time. If a change in the modulation characteristic should occur, this is indicated by a registered count proportional to the elapsed time from the last transmitting time impulse to instant when the change occurred. The transmission of the message will then start simultaneously with the transmitting time impulse immediately following the modulation characteristic change. The message is data indicating when a change in characteristic occurred. The message will, of course, be transmitted in the one of the time channels which corresponds with the latter mentioned transmitting time impulse. Within the binary code group, by which a message is transmitted, the pulses giving information as to the point in time when a modulation change occurred are preceded by a start pulse or bit, which has a polarity or level corresponding to the new polarity or level which now exists after the change in the modulation characteristic. Also, after the transmission of the data indicating the point in time at which a change occurred, the existing polarity or level is again transmitted.

1 Claim, 9 Drawing Figures

PROCESS FOR THE TRANSMISSION OF BINARY CODED SIGNALS USING TIME MULTIPLEX TECHNIQUES

BACKGROUND OF THE INVENTION

The invention described herein is related to a process for the transmission of binary coded communications from several communication channels over a common channel according to time multiplex principles. In particular, it is related to those systems in which the shortest code element in a communication is scanned frequently for transmitting, and when a change in modulation condition is noted, an indication of this is transmitted by changing the form of a binary coded impulse group. In such systems the transmission of a communication commences simultaneously with a given transmitting time impulse. When a modulation condition change is noted in one of the channels, transmission for that channel in the common channel is commenced after that change, i.e., a transmitting timing impulse is emitted. Several combined transmitting timing impulses are used for the transmission of the binary impulse group in codes.

Such a time multiplex transmission process in which the transmission path is transparent to codes up to a maximum transmission rate (above the latter rate a scanning deficiency is brought about by the scanning impulse which maximally can reach the value $\delta$) is already known from the U.S. Pat. No. 3,535,450. The principle of this process is illustrated in the time diagram that is shown in FIG. 1.

In FIG. 1, line a shows the communication signal $N_1$ with the minimum step duration S. This communication is scanned with a time T in intervals $t$. (line $b$) The larger $t$ is, the larger is also the scanning deficiency $\delta = t/s$ with respect to the determination of the point in time of the modulation condition change. The intervals that are represented by the longer marks represent the transmitting time S, i.e., those times in which the common transmission path is at the disposal of the communication $N_1$. Between the impulses S, the individual communications of the other communication channels are in succession applied to the common transmission path, until, again, the communication $N_1$ is scanned. With a modulation condition change in the communication $N_1$ a binary coded impulse group G (line $c$) is transmitted. This impulse group determines the point in time at which the change of the modulation condition in the output signal must be followed on the receiver input side. The moment at which the change of the modulation condition occurs is indicated on the transmission side by a counter arrangement that counts the intervals between two transmitting timing impulses S in units $t$. If a modulation condition change in the communication occurs between two transmitting timing impulses, the counting arrangement will be stopped, and the numerical value it has reached will be converted into a binary code combination. The latter code combination will be applied to the common transmitting line as impulse group G by the next following transmitting timing impulse S.

Accordingly, a signal for message $N_1$ will appear on the common transmission path, if there occurs a change of the modulation condition in the communication. If the same modulation condition prevails for a time longer than the time between transmitting time impulses, then no transmission signal is applied to the transmission path. In FIG. 1 the numerical value Z1 corresponds to the time condition for the first change of the modulation condition of the $N_1$ communication (the number of impulses $t$ between the preceding impulse S and the change in condition) that is transmitted with the next transmitting timing impulses S in the form of the binary coded impulse group G1. The second change of communication $N_1$ is characterized by the numerical value Z2, the third change by the numerical value Z3 and the impulse groups G2 and G3, respectively, that correspond thereto.

In a coded arrangement the binary coded impulse groups G1 through G3 are constructed from each of the numerical values Z1 through Z3. If a modulation condition change has occurred, then normally, not until the termination of a step duration s, does a further modulation condition change occur. Therefore, the first binary coded impulse group will be transmitted until the latter point in time. The impulse groups G according to FIG. 1 (line c) consist of 3 different kinds of bits. The first bit, the "Start step" always has the same polarity; in FIG. 1 this is, for instance, "1." This step forms the start signal and informs the receiver that the following bits are to be considered to be a communication that is to be correlated. The following bits indicate the instant in time relative to the last impulse S where a modulation condition change occurred. In FIG. 1 these are the 2nd, 3rd and 4th steps (101) of the code group that contains the binary number corresponding to the numerical count of impulses $t$.

Generally, the number of steps necessary for the indication of the count results from the following: N number ranges result from a step duration $s$ — one number range corresponds to the distance between two transmitting timing impulses S, between which at any time a test of whether the modulation condition change has occurred. The time duration between 2 transmitting timing impulses is $s/n$. In the time $s/n$ between two transmitting timing impulses S there are $s/(nt) = 1/(\delta)$ scanning intervals (FIG. 1, 8 intervals) of which one can include a modulation condition change. These scanning intervals are at any time counted. Each count result is needed for the construction of a binary code symbol, so that $1/(\delta n)$ code symbols are necessary. Each of these binary code signals has to have $1b\,(1/n\delta)$ time determining steps ($1b$ = logarithm to basis 2).

The last step of the binary coded impulse group will, at any time, indicate the modulation condition after the change, and this it will transmit as a binary "0" or a binary "1," as the case may be, in the impulse groups. So, in total each impulse group comprises $n = 2 + \log 2\,(1/n\delta)$ steps. This relation results from the condition that the binary coded impulse groups have to be transmitted until the end of the shortest step. The number of the number ranges, after which a step of the binary coded impulse group is transmitted with a transmitting timing impulse S has to be at least the same as the number of steps of the binary coded impulse group S. To transmit one of each of these $n$ steps, it is necessary to have one of the transmitting timing impulse S during the step duration $s$. The transmission starts with the transmitting timing impulse S that follows the modulation condition change. When there are no impulse groups transmitted, there is transmitted with the corresponding transmitting timing impulses S always the polarity of the modulation condition that is opposite that of the start step; in FIG. 1 this is the condition "0".

During a step duration s of the original communication $N_1$ one of the binary coded impulse groups with $n = 2 + \log 2\ (1/n\delta)$ steps in the common channel must be transmittable. From this develops the factor $n = f(\delta)$ (assuming that δ is known or $\delta n = 1/[n2^{n-2}]$ ). The transmission channel capacity has to be larger by the factor $n = f(\delta)$ than that of the channel for the transmission of the original communication $N_1$. This enlargement is a result of the signal conversion because of the scanning and coding of the occurrences of the modulation condition change.

It is the object of the invention to provide a process for signal conversion according to the above principles which requires as little channel capacity as possible.

SUMMARY OF THE INVENTION

The aforementioned and other objects are achieved by utilizing this invention in which before the step(s), a start step or bit is interposed inside the binary coded impulse groups along with the steps or bits for indication of the point in time at which the modulation condition change occurs, which start step has the polarity that at any time prevails in the communication to be transmitted after the modulation condition change. After the transmission of the mentioned steps for the indication of the point in time of the modulation condition change, again, as far as necessary, the prevailing polarity will again be transmitted.

Therefore, according to the invention, and in contradistinction to the prior art process described above, the start bit which indicates the beginning of a binary coded impulse groups also shows the new polarity. This new polarity is also transmitted after the steps for the indication of the time of occurrence of the modulation condition change, if the next modulation condition change does not immediately follow the binary coded impulse groups. It, therefore, follows that the transmission of a special step, which indicates new polarity, is superfluous. The latter, of course, is the mode of operation for the known process.

During a step duration s of the original communication $N_1$ only $m = 1 + \log 2\ (1/m\delta)$ steps must be transmittable according to the new process in the common channel. From this follows the function $m = f_2\ (\delta)$, resulting in the value $\delta_m = 1/(m.2^{m-1})$. Therefore, the required channel capacity for the converted signal has grown only by the factor $m = f_2\ (\delta)$. This smaller growth of the required channel capacity is especially noticeable when the scanning interval t is comparitively larger with a larger allowable distortion δ.

In utilizing the process according to the invention rather than the known process, the number of impulses in the binary coded impulse group can be kept constant. In this case, the number of time impulses of the binary coded impulse group increases by one impulse with the process according to the invention. The scanning interval t can be made correspondingly smaller so that the scanning distortion δ decreases. In addition, the interval of the transmitting timing impulses S and the number of the impulses to be transmitted per step, remain constant. However, it is also possible to leave the scanning interval t unchanged, and instead, enlarge the interval of the transmitting timing impulses S. The number of the impulses to be transmitted for each step then decreases. If, by utilizing the process according to this invention rather than the prior art process described above, the number of time determining impulses remains the same, so that the binary coded impulse group gets shorter by only one impulse, the interval of the transmitting timing impulses S and the scanning interval t can be correspondingly enlarged. The latter circumstance assumes a constant duration step. In this case, the scanning distortion will increase correspondingly. This increase will be smaller than when the number of impulses of the binary coded impulse group is decreased by one impulse in the prior art process (See following table). The number of the impulses to be transmitted each steplength decreases with one impulse. The following table gives a view of the allowable scanning distortion (δ) attainable for $n$ and $m$, respectively.

| | | | | | |
|---|---|---|---|---|---|
| $n$ | 1 | 2 | 3 | 4 | 5 |
| δ | 1 | 50% | 16 2/3% | 6 1/4% | 2 1/2% |
| $m$ | 1 | 2 | 3 | 4 | 5 |
| δ | 100% | 25% | 8 1/3% | 3 1/8% | 1 1/4% |

In the above table, the scanning distortion values are determined as follows: $\delta_n = 1/(n.2^{n-2})$ and $\delta_m = 1/(m.2^{m-1})$ . Therefore, with the same step number ($n = m$) for the binary coded impulse groups one realizes a 50 percent smaller scanning distortion with the process according to the invention than with the known invention.

In using the process according to the invention and no change in modulation condition occurs, within the transmitting timing impulse rate the last occurring polarity is continuously transmitted. If the binary coded impulse groups follow each other closely, the transmission of the prevailing polarity between the impulse groups can be omitted.

BRIEF DESCRIPTION OF THE DRAWINGS

The invention may be best understood by reference to a description given hereinbelow of a preferred mode for carrying out the invention in conjunction with the drawings in which.

DETAILED DESCRIPTION OF TWO FORMS OF THE INVENTION

Figures 1A, 1B, 1C:
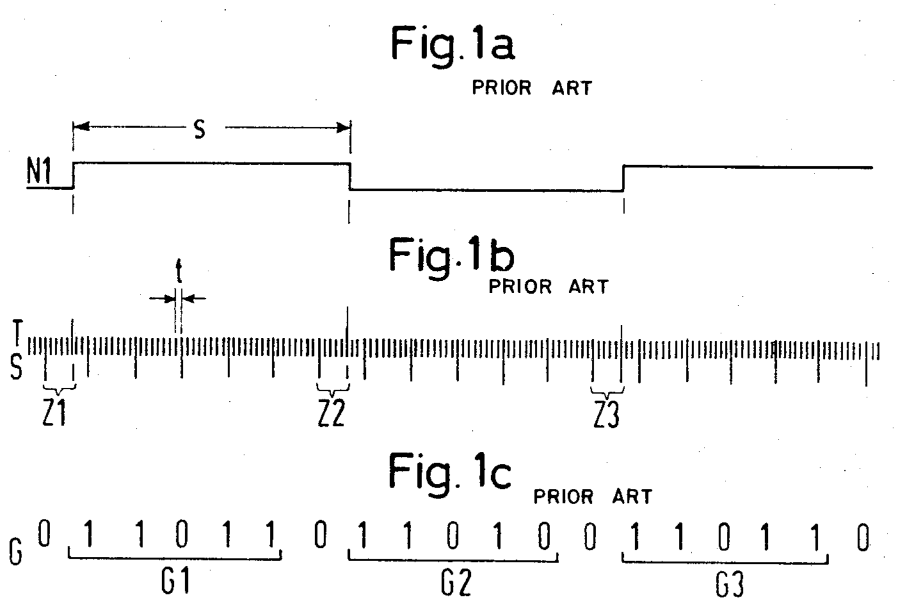
FIGS. 1*a*–1*c* are signal time diagram for the prior art process.
Figures 2A, 2B, 2C:
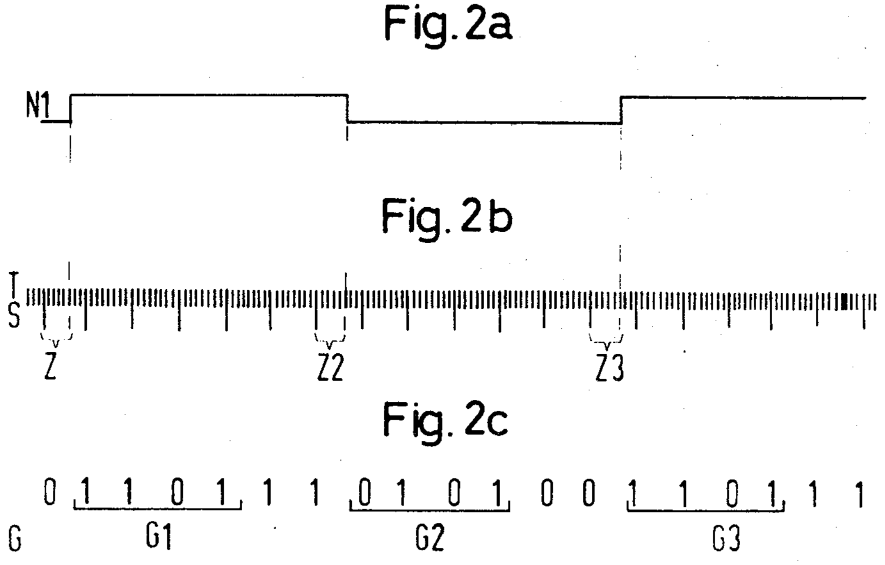
FIGS. 2*a*–2*c* are signal-time diagrams for a preferred process according to the invention.

FIG. 2 demonstrates with the aid of a signal-time diagram the principles of the invention. In line a is, again, shown the original communication $N_1$. Line *b* comprises the scanning impulses T and the transmitting timing impulses S, and in line c the count results for impulse groups G1, G2 and G3 are displayed. Each impulse group includes only 4 impulses, because the last impulse for indicating polarity is omitted. The start step for each impulse group indicates the newly occurring polarity, and the impulse between the impulse groups indicate the prevailing polarity. As in the example of the known process according to FIG. 1, discussed in he introductory portion of this specification, 48 scanning impulses T fall within a step length s. Thus, the scanning distortion $\delta = t/s = 1/48 = 2\ 1/12$ percent has remained constant.

In this example, the complete step duration s is used for the transmission of the binary coded impulse group G. The transmission of the impulse group G will now only require 4 transmitting timing impulses S. However, as with the known process according to FIG. 1, six impulses for each step length have to be transmitted. It will be shown that there are given ranges of the allowable scanning distortion, in which the process according to the invention requires only half as many impulses as the known process.

Figure 5:
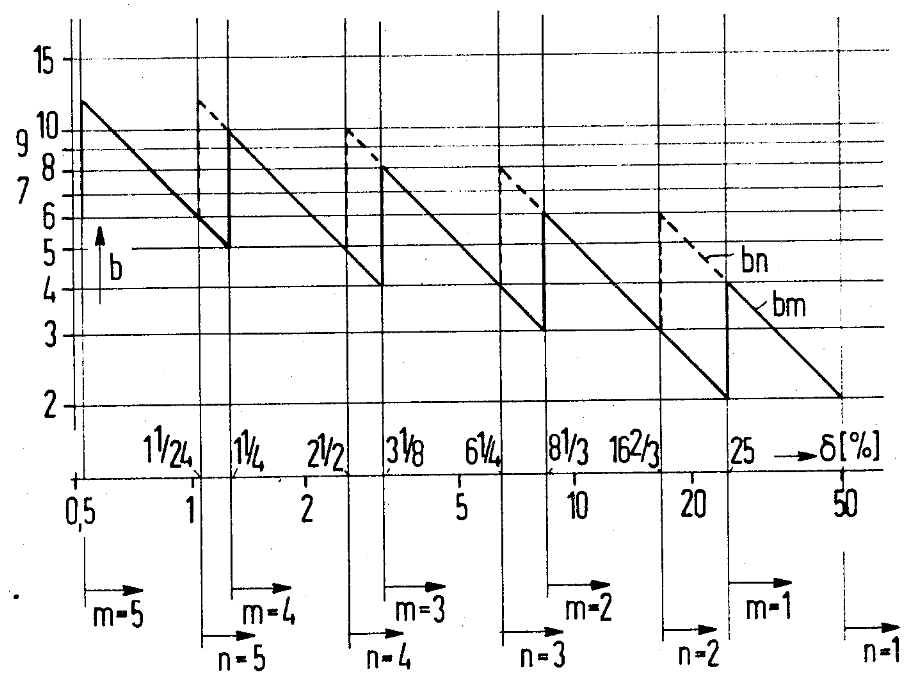

During the durations $s_n$ and $s_m$ of the respective binary coded impulse groups n and m impulses respectively, are transmitted. Then during the longer step duration $s$, $b_n = n.\ (s/s)$ and $b_m = m.s/s$ impulses respectively, are transmitted. In this case, $s/(s_{n,m})$ is greater than 1 and $b_n$ and $b_m$ are larger than $n$ and $m$, respectively. The step duration $s$ corresponds to the scanning distortion $\delta = t/s$, the duration $s_n$ and $s_m$ on the other hand correspond to the scanning distortion $\delta_n = 1/(n.2^{n-2})$ and $\delta_m = 1/(m.2^{m-1})$, respectively. The proportions $s_n/s = \delta/(\delta^n)$ and $s_m/s = \delta/(\delta^m)$, hold true for this case. From the latter, the impulses transmitted during the step duration s are determined by: $b_n = 1/(2^{n-2} . \delta)$ and $b_m = 1/(2^{m-1} \cdot \delta)$ These relationships are shown in the diagram in FIG. 5, wherein the ordinate illustrates the value for $b$ and the abcissa gives the scanning distortion in logarithmic terms.

For a given number $m$, if the scanning distortion is enlarged, while the step duration s is reduced, the step duration approaches the value $s_m$, the scanning distortion the value $\delta_m$ and the number $b_m$ for the impulses transmitted each step duration $s$ of the value $m$. If the step duration $s$ is reduced further, then the number $m$ must be reduced by one, because the binary coded impulse groups may not be longer than the step duration $s$. The number of time determining impulses will thus be decreased by one. Therefore, the number of the transmitting timing impulses S, to be transmitted each step duration, as well as the value of $b_m$ has to be doubled. The values $\delta = \delta_m$ and $\delta = \delta_n$ yield as a result a change of the value $m$ and $n$ by 1 and a discontinuity in the curves $b_m$ and $b_n$. From the diagram, it may be determined that the value of $b_n$ (known process) is the same as he value $b_m$, when the correlation $n - 1 = m$ is valid. On the other hand, if $n = m$, then $b_n$, the required transmission channel capacity, is twice as large as $b_m$. These values, in which the process according to the invention requires only half as many impulses than the known process, lie, as is clear from the FIG. 5 diagram, between 25 percent and 16 ⅔%, 8 ⅓% and 6 ¼%, 3 ⅛% and 2 ½%, 1 ¼% and 1 1/24%, etc.

Figures 3, 4:
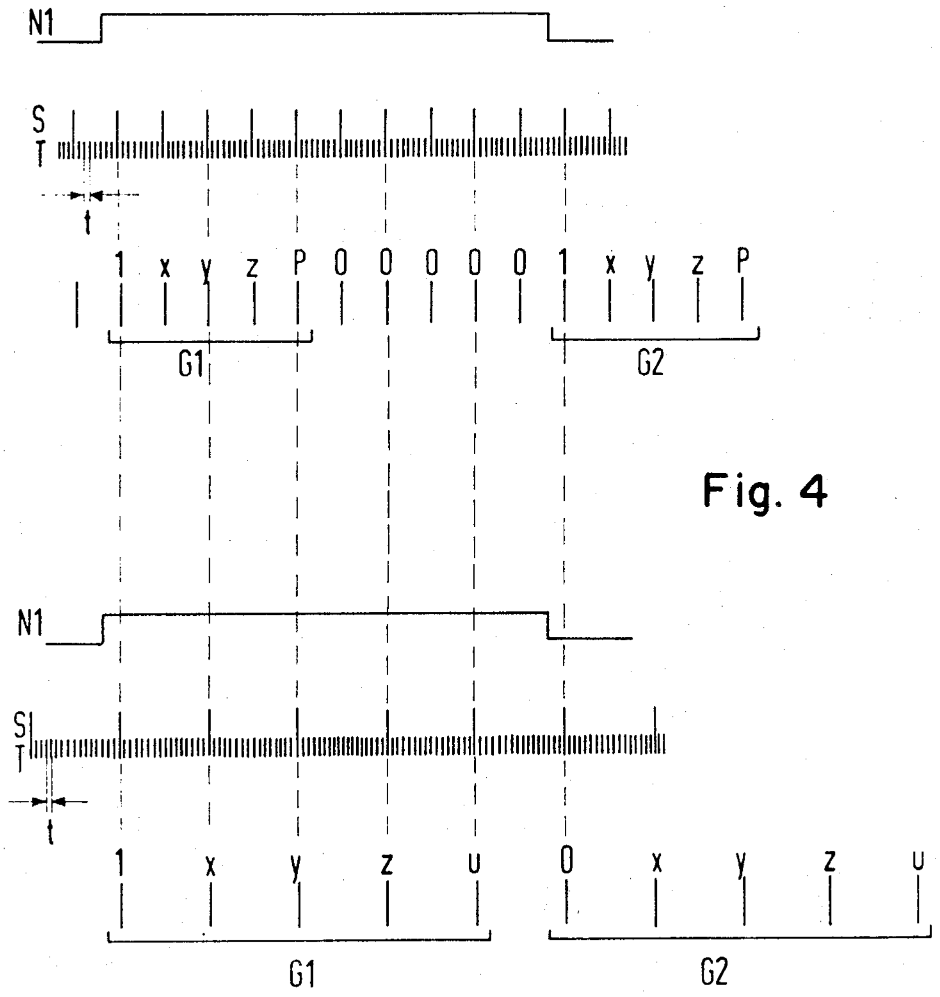
Fig. 3 PRIOR ART
FIG. 3 is a further signal-time diagram for the prior art process.
FIG. 4 is a signal-time diagram for an alternative process according to the invention and FIG. 5 is a diagram, illustrating the realized enlargement of the transmission channel capacity using this invention.

An example for $\delta = 1\ ¼\%$ $(s - 80t)$ is shown in FIG. 3 and FIG. 4. In FIG. 3 is again shown the known process with $n = 5$ and $b_n = 10$. The bits $x$, $y$, $z$, are the time determining impulses, the bit P is the polarity bit. FIG. 4 illustrates the process derived from this according to the invention with $m = 5$ and $b_m = 5$. The bit $u$ is the fourth time determining impulse.

The inventive process is described hereinabove by means of signal-time diagrams, because the invention can be best understood by this method of exposition. It is to be understood that the method of this invention may be carried out by otherwise conventional time multiplex data transmission apparatus, which has been modified or adjusted only to accommodate the signal coding according to the invention. Apparatus which may be used to perform the method of this invention is fully described in U.S. Pat. No. 3,535,450. In particular, the apparatus described in FIG. 3 of that patent can be used. In order to perform the method described herein it is necessary only to change the coders. C1 through C4 in this apparatus to produce the binary code group in accordance with this invention; these coders are only conventional binary counting systems, which those skilled in the art can readily modify in order to produce the binary code group described herein. The latter modifications or adjustments will be obvious to one skilled in the art.

I claim:

1. A process for the transmission of message signals originating in a plurality of communication channels over a common communication channel using the time multiplex principle, wherein the information in each channel is caused to be transmitted by a transmitting timing pulse occurring at the allotted time for that channel, said pulses being repeated at a predetermined rate, and wherein the message signal in each of said channels comprises a train of steps with a change in level being indicative of message content, comprising the steps of:

scanning the message step of least duration in each channel a plurality of times between transmitting times for that channel, registering a count in each channel for a change in level occurring in said channel and noted during said scanning step, said count being proportional to the elapsed time between the last occurring transmitting timing pulse and the occurrence of said change in polarity, transmitting data regarding said count commencing with the occurrence of the next transmitting timing pulse following said change in polarity, said data being a binary code group formed from said count, said binary code group being transmitted using a plurality of succeeding transmitting timing pulses as needed according to the number of characters in said binary code group and arranging a start bit to precede the portion of said binary code group indicating the time of said change in level, said start bit having a level corresponding to the level of said scanned signal subsequent to said change in level, a bit corresponding in level to said start bit being transmitted following said binary code group, if there has been no change in level of said message signal upon the occurrence of the next succeeding transmitting timing pulse.

* * * * *